US011872558B2

(12) United States Patent
Nguyen-DeMary et al.

(10) Patent No.: US 11,872,558 B2
(45) Date of Patent: *Jan. 16, 2024

(54) WELL PLATE ASSEMBLY WITH PRESSURE RELEASE MECHANISM

(71) Applicant: Merck Sharp & Dohme LLC, Rahway, NJ (US)

(72) Inventors: Tinh Nguyen-DeMary, Milltown, NJ (US); William James Ciolino, Union Town, NJ (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,239

(22) Filed: Jul. 14, 2022

(65) Prior Publication Data

US 2022/0379303 A1 Dec. 1, 2022

Related U.S. Application Data

(63) Continuation of application No. 16/799,523, filed on Feb. 24, 2020, now Pat. No. 11,426,730.

(51) Int. Cl.
*B01L 3/00* (2006.01)
*F16K 99/00* (2006.01)
*F16K 15/14* (2006.01)

(52) U.S. Cl.
CPC ..... *B01L 3/502738* (2013.01); *B01L 3/50853* (2013.01); *B01L 3/502723* (2013.01); *F16K 99/0015* (2013.01); *B01L 2200/027* (2013.01); *B01L 2200/0684* (2013.01); *B01L 2300/049* (2013.01); *B01L 2300/0829* (2013.01); *B01L 2400/0622* (2013.01); *F16K 15/148* (2013.01); *F16K 2099/0084* (2013.01)

(58) Field of Classification Search
CPC ....... B01L 2200/026; B01L 2200/0684; B01L 2300/049; B01L 2300/0829; B01L 2400/0605; B01L 3/502723; B01L 3/502738; B01L 3/50853; F16K 15/148
See application file for complete search history.

(56) References Cited

U.S. PATENT DOCUMENTS

2018/0023712 A1* 1/2018 Harbrecht ........... F16K 31/1266
137/597
2020/0238282 A1* 7/2020 Burns ............... B01L 3/502715

* cited by examiner

*Primary Examiner* — Jennifer Wecker
*Assistant Examiner* — Jonathan Bortoli
(74) *Attorney, Agent, or Firm* — Fenwick & West LLP

(57) ABSTRACT

A well plate assembly with an interior channel system in the well plate lid provides a more efficient and uniform distribution of fluid into a receptacle positioned below the well plate lid. The channel system in the lid allows air, or other fluid, to pass through with the use of a pump to each of a plurality of channels in the receptacle. Inlet and outlet valves in the lid prevent a gasket positioned between the lid and the receptacle from releasing contact with the receptacle due to high pressure experienced during the injection of fluid into the assembly. Specifically, pressure under a specified tolerance passes through the inlet valves, and if the pressure within the channel system exceeds the limit of the outlet valve, the outlet valve opens and allows air to escape the lid safely without disturbing the fluid flow into the channels below.

15 Claims, 6 Drawing Sheets

WELL PLATE ASSEMBLY WITH PRESSURE RELEASE MECHANISM

CROSS REFERENCE TO RELATED APPLICATIONS

This application is a continuation of U.S. application Ser. No. 16/799,523, filed Feb. 24, 2020, the content of which is incorporated by reference.

TECHNICAL FIELD

The subject matter described herein generally relates to chemical analysis instruments, and more specifically, to a well plate assembly with an interior channel system to distribute fluid received through a ported lid to each of the channels in the well plate.

BACKGROUND

Titration is a common laboratory method for chemical analysis that is routinely used in early pharmaceutical development. It is used to determine the solubility of the active pharmaceutical ingredient (API), which is essential to the drug's eventual safety and efficacy. During experimentation, API is injected into a standard well plate through a ported rubber gasket that sits on top of the plate. During injection, it is common that API in liquid form bursts out of the wells due to the high pressure concentrated in portions of the plate. Additionally, the high pressure in the plate can cause the gasket to easily detach from the plate. Still further, conventional designs use a silicon plate to cover the wells, such that a user must use a syringe to puncture the membrane of each individual well to distribute the API. This method forces the API fluid down into the middle of the well, creating a splatter and preventing a uniform mix of the API in the well.

BRIEF DESCRIPTION OF THE DRAWINGS

The disclosed embodiments have advantages and features which will be more readily apparent from the following detailed description and the appended claims, when taken in conjunction with the accompanying drawings, in which:

Figure (FIG.) 1 illustrates a perspective view of a well plate assembly with an interior channel system, according to an example embodiment.

DETAILED DESCRIPTION

Figure 1:
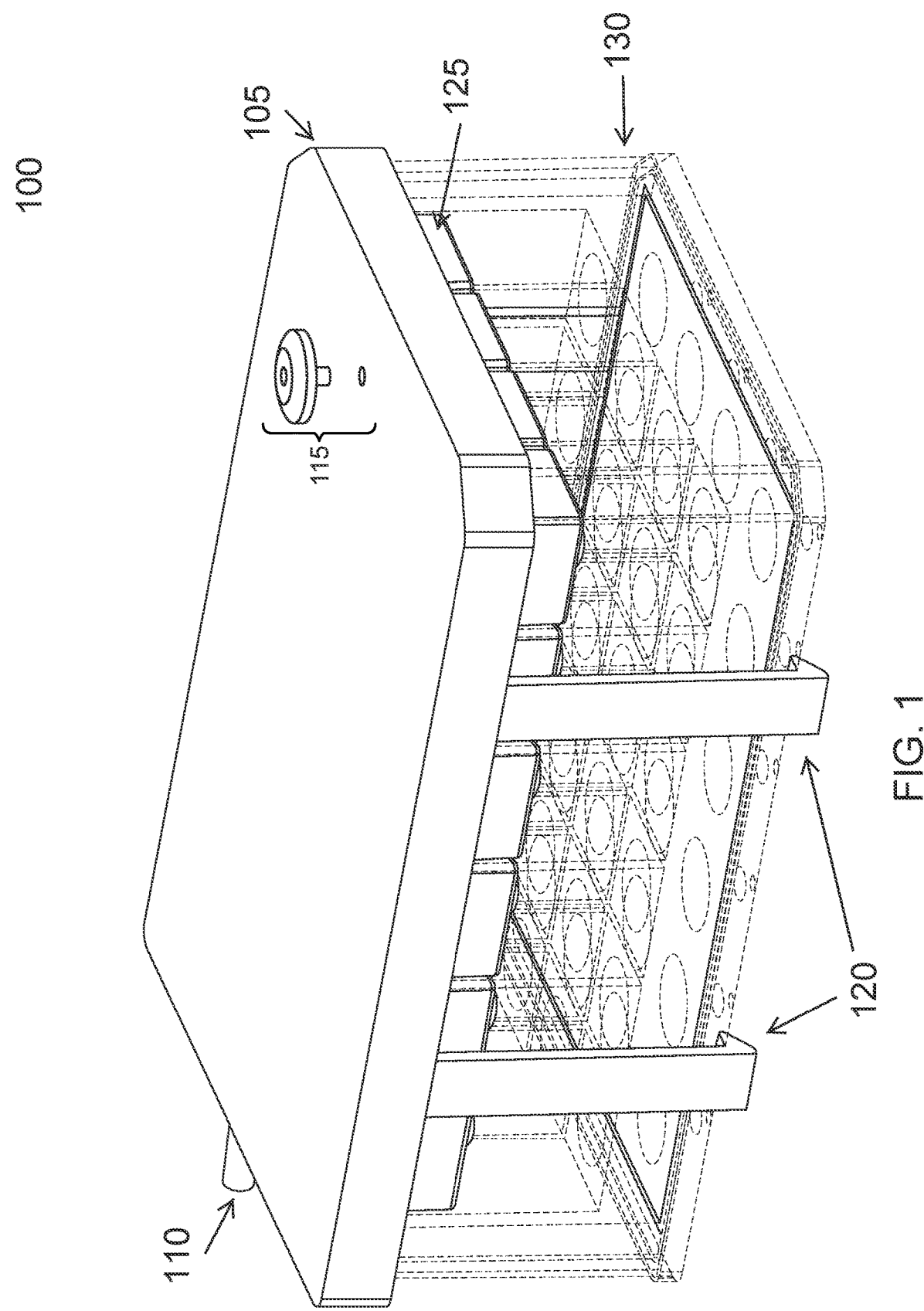

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described.

A well plate assembly with an interior channel system in the well plate lid provides a more efficient and uniform distribution of API into the individual wells of the plate. Clips on the bottom of the well plate lid lock the assembly in place. A gasket below the lid has extrusions that may extend deeper into the wells of the plate than conventional designs. This may increase the amount of frictional force required to remove the gasket from the plate below. The lid design therefore may improve the efficiency of the experiment (e.g., by making the environmental or mechanical parameters of the process reproducible) and improve safety of the user by preventing API from being released to the surroundings during experimentation.

Additionally, the channel system in the lid allows air, or other fluid, to pass through with the use of a pump to each of the channels in the well plate, allowing even distribution of the API into the individual wells. Inlet and outlet valves in the lid prevent the gasket from releasing contact with the plate due to high pressure experienced during injection. Specifically, pressure under a specified tolerance passes through the inlet valves, and if the pressure within the wells exceeds the limit of the outlet valve, the outlet valve opens and allows air to escape the lid safely without disturbing the fluid flow into the well below.

Referring now to Figure (FIG. 1), it illustrates a perspective view of an example embodiment of a well plate assembly 100. In the embodiment shown, the well plate assembly 100 includes a well plate lid 105 with an inlet 110, one or more outlet valves 115, and lid clips 120 and a gasket 125 positioned below the well plate lid 105 and above a well plate 130. In the displayed embodiment, the well plate lid 105 further includes a plurality of API delivery valves 135 (e.g., umbrella valves). In other embodiments, the well plate assembly 100 may include different, additional, or fewer elements. For example, the lid clips 120 may be omitted.

The well plate lid 105 is positioned above and covers the gasket 125 and includes lid clips 120 that lock the well plate assembly 100 in place on top of the well plate 130. In one embodiment, the size and shape of the well plate lid 105 and the gasket 125 are based on the configuration of the well plate 130. For example, the well plate lid 105 shown in FIG. 1 is substantially rectangular with two side walls of a first length adjacent to front and rear walls of a second, shorter length such that the well plate lid 105 fits on top of a gasket 125 and a well plate 130 having a rectangular grid configuration of cross-sectional shaped wells. Additionally, in one embodiment, the well plate lid 105 includes an internal channel system that receives API pumped through the inlet 110 and distributes the API through the API delivery valves 135 and the gasket 125 to each of the wells in the well plate 130. The configuration of the internal channel system and the API delivery valves 135 is discussed in more detail below with respect to FIG. 2.

The well plate lid 105 further includes one or more outlet valves 115 that allow air and API to pass safely out of the channel system within the well plate lid 105. For example, the problem of the gasket 125 releasing contact with the well plate 130 due to high pressure experienced during injection of the API may be solved using the inlet 110 and the outlet valves 115. Pressure under a specified tolerance passes through the inlet 110, and responsive to the pressure within the internal channel system exceeding a threshold level (e.g., five pounds per square inch (PSI), ten PSI, etc.), the outlet valve 115 opens, allowing air and API to pass out of the well plate assembly 100 without disturbing the flow of API or other fluid into the wells. In the embodiment shown in FIG. 1, there is a hole in the top surface of the well plate lid 105 that connects to the internal channel system and an outlet valve 115 (e.g., an umbrella valve) sits within the hole. In other embodiments, different types of outlet valve 115 may be used and may be mounted in different locations on the well plate lid 105. For example, another embodiment may include a pair of outlet valves 115 mounted in holes connecting the internal channel system to the exterior environment on opposite sides of the well plate lid 105.

The lid clips 120 extend downward from the well plate lid 105 to the bottom of the well plate 130 to secure the well plate lid 105 and the gasket 125 in place on the well plate 130. In the embodiment shown in FIG. 1, the well plate lid 105 includes two lid clips 120 positioned along the side walls of the well plate lid 105. While not shown in FIG. 1, the well plate lid 105 further includes two lid clips 120 located parallel to the displayed lid clips 120 on the opposite side wall of the well plate lid 105. The lid clips 120 may also help prevent the gasket 125 leaving contact with the well plate 130. In other embodiments, the well plate lid 105 includes fewer or more clips 120 (including zero) located on the side walls and/or on the front or rear walls of the well plate lid 105.

The gasket 125 is positioned above the well plate 130 and is compressed by the well plate lid 105 to provide a vacuum seal for each individual well in the well plate 130, thus preventing API or other fluid from flowing between the wells (e.g., if the well plate assembly 100 is inverted or otherwise agitated). In one embodiment, the gasket 125 is a unitary sheet with openings or extrusions configured to match the number and arrangement of wells in the well plate 130. Each extrusion in the gasket 125 extends downward into an individual well such that the API may be distributed into the well from the channel system in the well plate lid 105. Friction between the extrusions and the walls of the well plate 130 may also help prevent the gasket 125 leaving contact with the well plate 130. In various embodiments, the gasket 125 is made of silicone rubber or another type of elastomer.

The well plate 130 includes individual wells configured in a grid layout. In one embodiment, the well plate 130 has individual wells that are open at the top and are sealed closed by a micron-level thick film that encounters the API and a bottom plate that locks the film in place. In one embodiment, the well plate 130 includes twenty-four wells in a six-well by four-well rectangular layout, while in other embodiments, the well plate 130 is smaller (e.g., a twelve-well well plate with a four-well by three-well rectangular configuration) or larger (e.g., a an eight-well by six-well rectangular configuration with forty-eight total wells). Each well is configured to receive an extrusion portion of the gasket 125 that extends downward into the well and through which a liquid, such as API, is inserted.

The well plate assembly 100 may be made of nylon, acrylonitrile butadiene styrene (ABS) plastic, thermoplastic polymer (such as polyethylene, polypropylene, or polytetrafluoroethylene), or another rigid material and may be manufactured using injection molding, panel forming, blow molding, thermoforming, 3D printing, or the like. The well plate assembly 100 may be constructed in a single piece or in multiple pieces. For example, in one example embodiment, the well plate lid 105 is constructed separately from the gasket 125. In another example embodiment, the well plate lid 105 is constructed in multiple pieces and assembled (e.g., using vacuum molding to bond together the individual pieces).

In one example embodiment, the well plate assembly 100 has a height of approximately 75 millimeters, a width of approximately 85 millimeters, and a length of approximately 128 millimeters. In other embodiments, the dimensions of the various portions of the well plate assembly 100 are be different to enable engagement with well plates 125 of various sizes and configurations. In general, the well plate assembly 100 may be configured to engage with any type of well plates 125.

Figure 2:
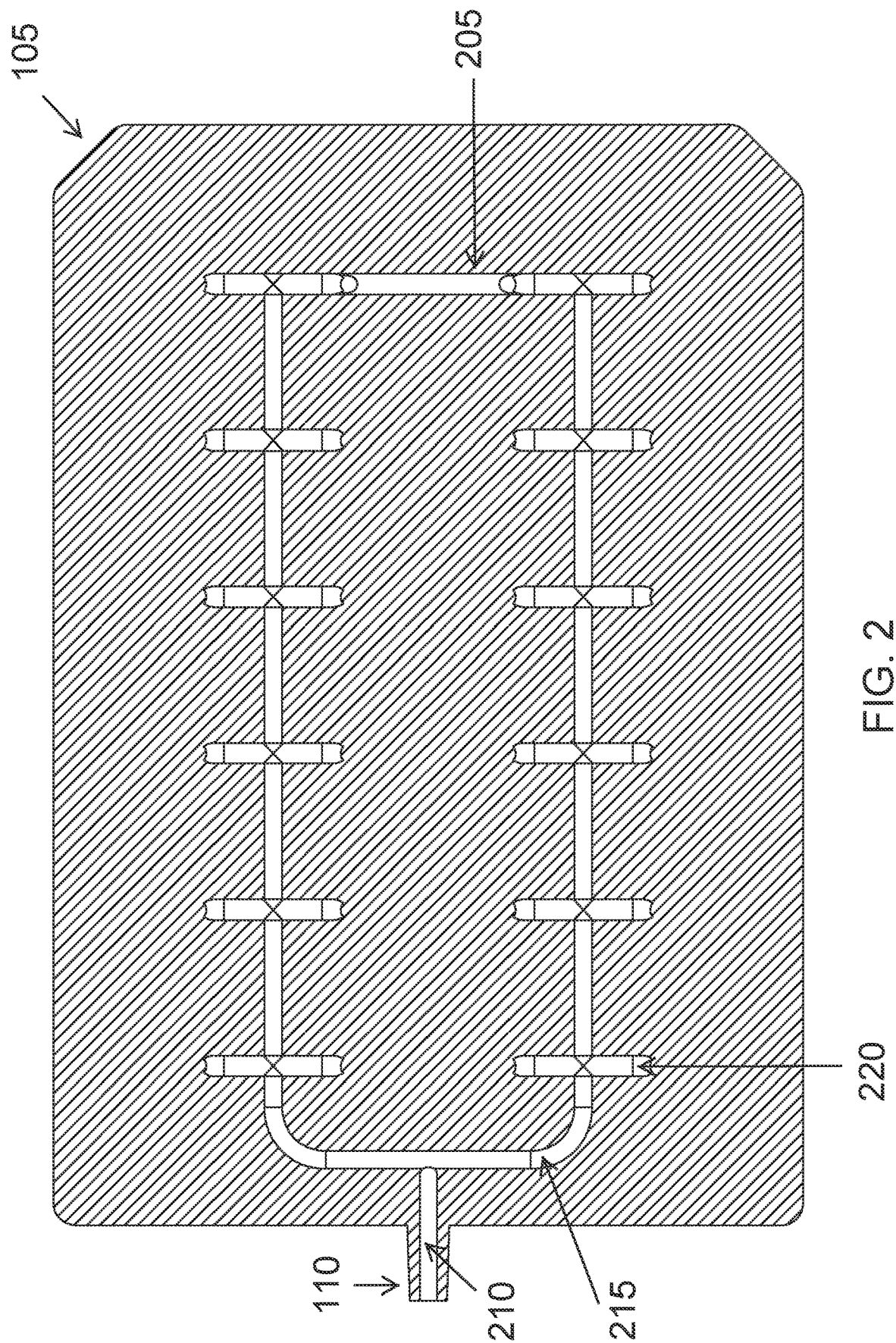
FIG. 2 illustrates a top cross-sectional view of a well plate lid showing an interior channel system, according to an example embodiment.

FIG. 2 illustrates a top cross-sectional view of a well plate lid 105 showing an interior channel system 205. In the example embodiment shown in FIG. 2, the channel system 205 includes an inlet channel 210 positioned in the inlet 110 and through which the API or other fluid enters the well plate lid 105, a distribution channel 215 through which the API flows, and an API delivery valve 135 positioned above each well in the well plate 130 through which the API is distributed into the well.

In the displayed embodiment, the distribution channel 215 begins at a first point adjacent to the inlet channel 210 and splits into left and right branches to distribute the API to wells on the left and right sides of the well plate. The flow of the distribution channel 215 may be bidirectional such that API entering through the inlet channel 210 flows through the channel system 205 and into the wells while air leaving the wells through the API delivery valves 135 may travel through the channel system 205 to an outlet valve 115.

The API delivery valves 135 control the distribution of API into the wells by opening and closing based on the pressure in the channel system 205. For example, in one embodiment, when the pressure in the channel system 205 is less than a first threshold level (e.g., three PSI), the API delivery valves 135 remain closed such that the API does not enter the well. Responsive to the pressure exceeding the threshold level, the API delivery valves 135 open to allow the flow of API through the valves 220 and the gasket 125 along the side walls of each well.

In one embodiment, the API delivery valves 135 control the rate of API flow such that a higher pressure in the channel system 205 causes the API delivery valves 135 to open further, increasing the rate at which API enters the wells, while a lower pressure in the channel system 205 causes the API delivery valves 135 to open less, decreasing the rate at which API enters the wells. The rate of fluid flow into the individual wells is thus based in part on a position of the API delivery valves 135 and the pressure inside the channel system 205. Although air may escape each well while the API delivery valves 135 are open, the overall pressure in the wells increases as a result of the API flow. Further, if the pressure in the channel system 205 exceeds a second threshold level (e.g., four PSI), the outlet valve 115 opens to allow air and API to escape the well plate lid 105, The API delivery valves 135 may also close to prevent the additional flow of API into the wells. In general, the API delivery valves 135 and the outlet valve 115 may be selected to tailor the first and second threshold pressures for a particular use case. The API delivery valves 135 set the minimum pressure that is required for API to enter the wells and the outlet valve 115 sets a maximum pressure above which it opens to release excess pressure before another, potentially more problematic failure occurs (e.g., the well plate 130 separating from the rest of the assembly 100). The structure and operation of the API delivery valves 135 is discussed in more detail below with respect to FIG. 4.

Figure 3:
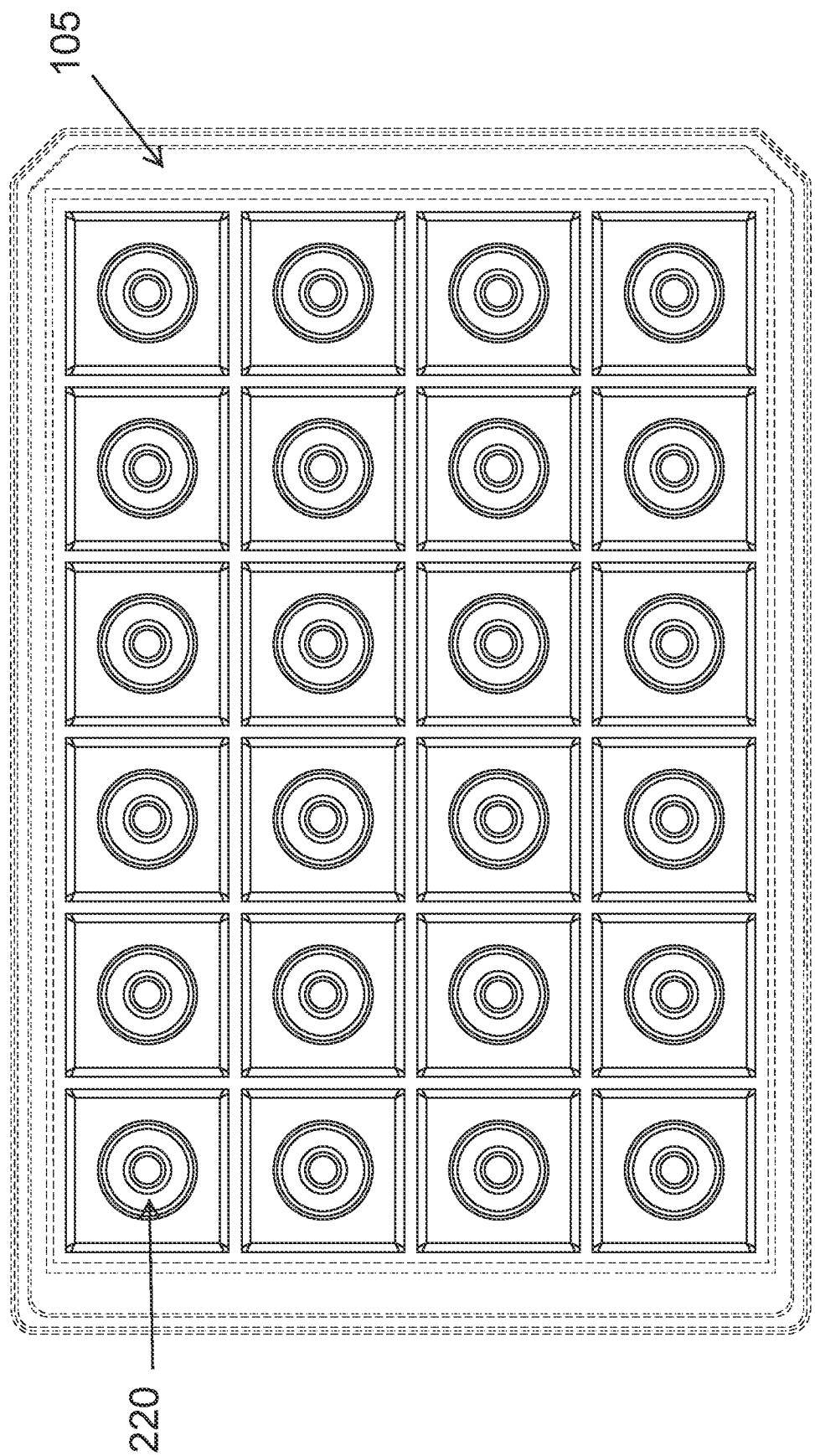
FIG. 3 illustrates a top cross-sectional view of a well plate lid showing an arrangement of umbrella valves, according to an example embodiment.

FIG. 3 illustrates a top cross-sectional view of the well plate lid 105 showing an arrangement of API delivery valves 135. In the embodiment shown in FIG. 3, the API delivery valves 135 are arranged in a grid configuration mapped to the size and shape of the well plate 130 (not shown). The well plate lid 105 includes an API delivery valves 135 for each well in the well plate 130 such that each API delivery valves 135 controls the flow of API into, and the flow of air out of, an individual well based on the pressure in the channel system 205 above the API delivery valves 135, as discussed above with respect to FIG. 2.

Figure 4:
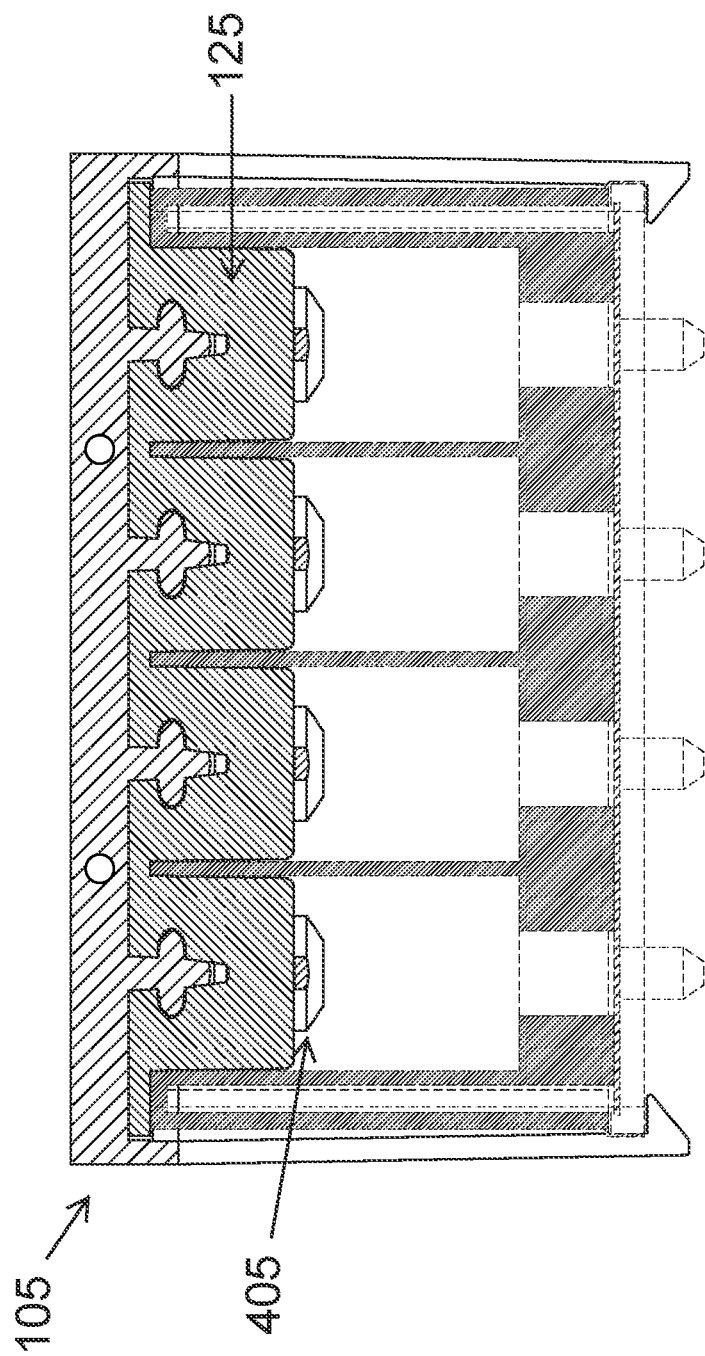
FIG. 4 illustrates a front cross-sectional view of the well plate assembly of FIG. 1, according to an example embodiment.

FIG. 4 illustrates a front cross-sectional view of the well plate assembly 100, according to an example embodiment. In the embodiment shown in FIG. 4, the well plate lid 105 includes API delivery valves 135 extending through the extrusions in the gasket 125 and into the wells. Each API delivery valve 135 includes a sealing disc 405 attached at a bottom of a valve stem (not shown). Prior to the introduction of API into the well plate assembly 100, the API delivery valves 135 are initially in a closed position such that the wells are sealed closed and secured by the gasket 125 and the well plate lid 105. When the pressure in the channel system 205 exceeds a first threshold level, the pressure causes the API delivery valves 135 open by pushing the sealing disc 405 downward to allow API to enter the well from the distribution channel 215 and travel down the sides of the well walls to the bottom of the well. Conversely, when the pressure in the channel system 205 exceeds a second threshold level, the output valve opens to allow the release of air, thus lowering the pressure in the channel system 205.

Figure 5:
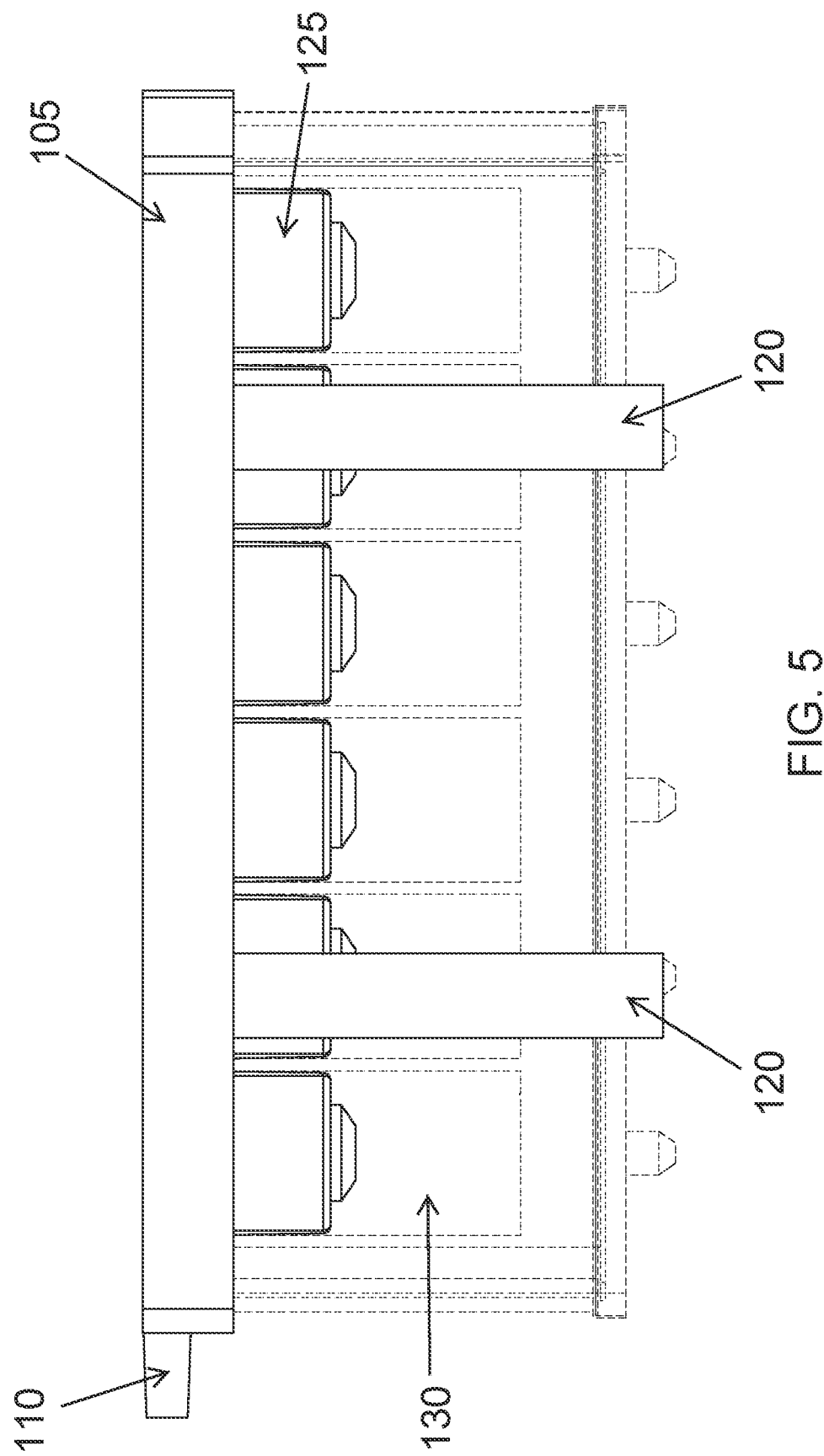
FIG. 5 illustrates a side view of the well plate assembly of FIG. 1, according to an example embodiment.

FIG. 5 illustrates a side view of the well plate assembly 100, according to an example embodiment. In the embodiment shown in FIG. 5, the well plate lid 105 secures the gasket 125 in place on top of the well plate 130 by means of the lid clips 120. API is introduced through a pump (not shown) into the well plate assembly 100 via the inlet 110 and is distributed through extrusions in the gasket 125 to the wells of the well plate 130 by means of the interior channel system. The well plate lid 105 additionally includes an outlet valve 115 to release air and API from the well plate lid 105, thus lowering the pressure and preventing the API from escaping the individual wells in the well plate 130.

Figure 6:
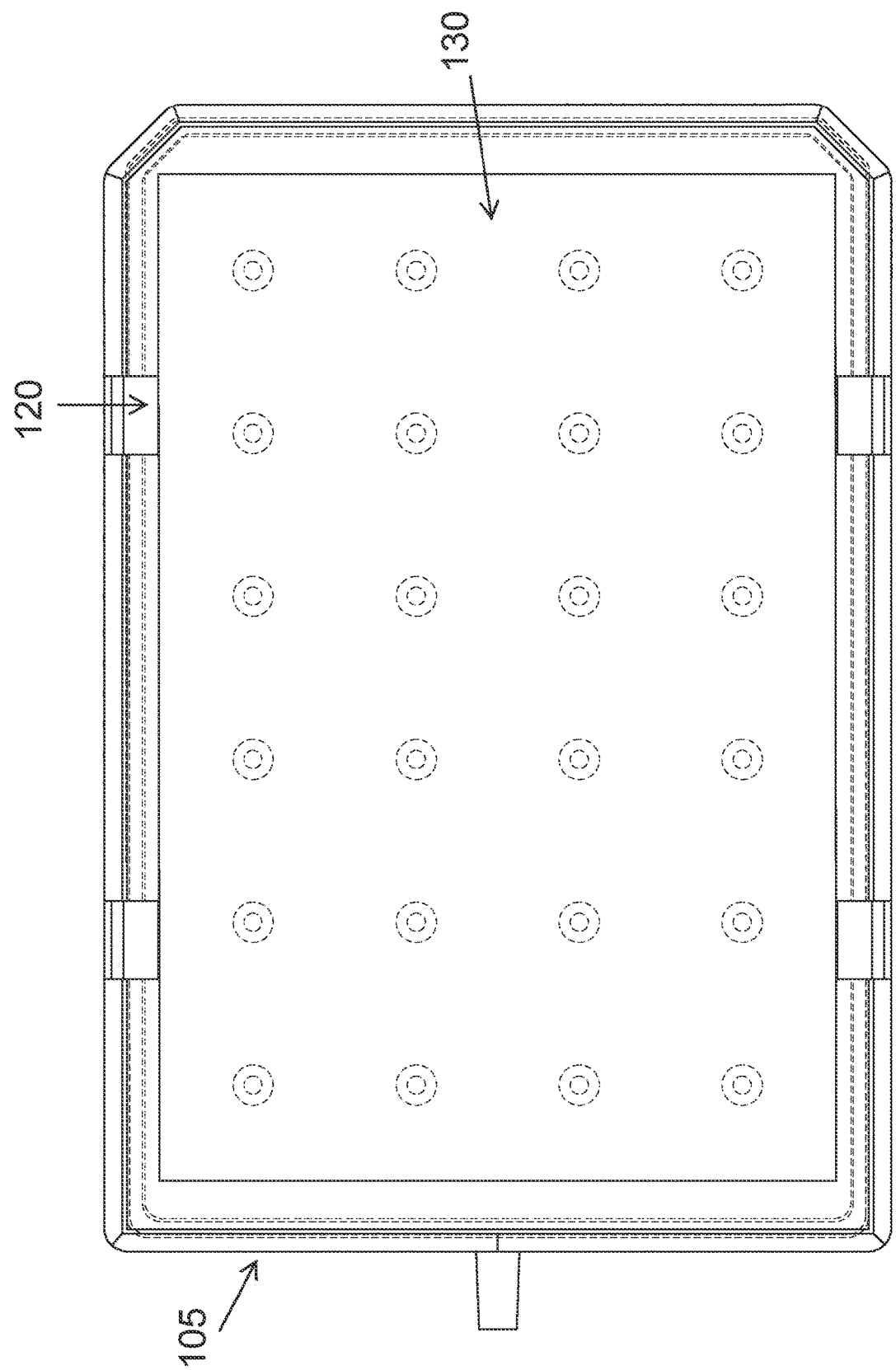
FIG. 6 illustrates a bottom view of the well plate assembly of FIG. 1, according to an example embodiment.

FIG. 6 illustrates a bottom view of the well plate assembly 100, according to an example embodiment. As shown in FIG. 6, the well plate lid 105 is secured to the well plate 130 by means of a plurality of lid clips 120 that extend downward from the lid to the bottom of the well plate 130. While the displayed embodiment includes four lid clips 120 arranged parallel to each other on first and second sides of the well plate assembly 100, in other embodiments, the assembly 100 includes more or fewer lid clips 120 arranged in various configurations (e.g., at first or second ends of the well plate assembly 100).

The disclosed configurations provide advantages over existing chemical analysis instruments. For example, the lid clips 120 extend downward from the well plate lid 105 to the bottom of the well plate 130, securing the well plate lid 105 and gasket 125 in place on top of the plate 125. The gasket 125 located below the well plate lid 105 is mapped to directly fit the cross-sectional shape of each well and has extrusions that extend deeper into the wells such that the gasket 125 may be sealed into the wells, and vacuum pressure prevents the gasket 125 from moving during injection of the API. Additionally, the channel system 205 in the well plate lid 105 allows fluid to pass through the well plate lid 105 for even distribution into the individual wells, and an outlet valve 115 allows air to pass safely from within the wells to outside the well plate assembly 100 without disturbing the fluid flow into the wells.

While the embodiments described herein use a lid having an interior channel system, inlet and outlet valves, and lid clips to introduce API into a well plate, in alternative configurations, the ported lid may be coupled to other instruments or receptacles and used to introduce and regulate the flow of other liquids into one or more compartments in the article.

As used herein, the terms "comprises," "comprising," "includes," "including," "has," "having," or any other variations thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Additionally, as used herein, the term "approximately" means within 10% of the stated value unless it is otherwise apparent from the context.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A receptacle lid comprising:
    an inlet channel configured to receive fluid from a content source coupled to the receptacle lid;
    a plurality of delivery valves, each delivery valve having an input configured to receive fluid from the inlet channel and an output configured to deliver fluid to a receptacle when the lid is connected to the receptacle;
    a gasket, positioned between the receptacle lid and the receptacle, comprising a unitary sheet with a plurality of extrusions mapped to a size and shape of the receptacle; and
    an interior channel system coupled to the inlet channel and configured to distribute the received fluid from the inlet channel to the inputs of the plurality of delivery valves, wherein the fluid is delivered to the receptacle through the delivery valves responsive to a pressure in the interior channel system exceeding a threshold.

2. The receptacle lid of claim 1, wherein the receptacle is a well plate.

3. The receptacle lid of claim 1, further comprising:
    a plurality of lid clips extending downward from a bottom of the receptacle lid and configured to secure the receptacle lid to a bottom of the receptacle.

4. The receptacle lid of claim 1, further comprising an outlet valve configured to open to allow release of fluid responsive to the pressure in the interior channel system exceeding a second threshold.

5. The receptacle lid of claim 4, wherein the outlet valve is an umbrella valve.

6. The receptacle lid of claim 4, wherein the outlet valve is positioned on a top surface of the receptacle lid.

7. The receptacle lid of claim 4, wherein the inlet channel is positioned at a first end of the receptacle lid.

8. The receptacle lid of claim 7, wherein the outlet valve is positioned at a second end of the receptacle lid, the second end opposite the first end.

9. The receptacle lid of claim 1, wherein each delivery valve includes a sealing disc attached at a bottom of a valve stem, the sealing disc extending through an extrusion in the gasket and into the receptacle.

10. The receptacle lid of claim 1, wherein the receptacle is a well plate and wherein the extrusions extend into each well of the well plate.

11. The receptacle lid of claim 1, wherein a flow of fluid in the interior channel system is bidirectional.

12. The receptacle lid of claim 1, wherein the threshold pressure is approximately three pounds per square inch (PSI).

13. The receptacle lid of claim 4, wherein the second threshold pressure is approximately four pounds per square inch (PSI).

14. The receptacle lid of claim 1, wherein the delivery valves are umbrella valves.

15. The receptacle lid of claim 14, wherein a rate of fluid flow into a given receptacle varies based on a position of a corresponding umbrella valve.

\* \* \* \* \*